H. VAN R. PALMER.
PHOTOGRAPHIC DEVICE.
APPLICATION FILED JUNE 20, 1913.
1,143,722.
Patented June 22, 1915.
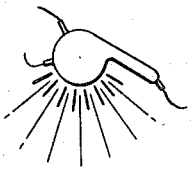
Fig.1.
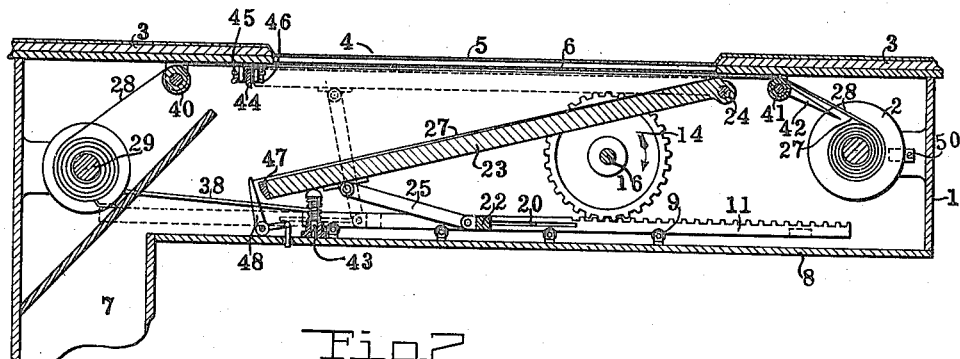
Fig.2.
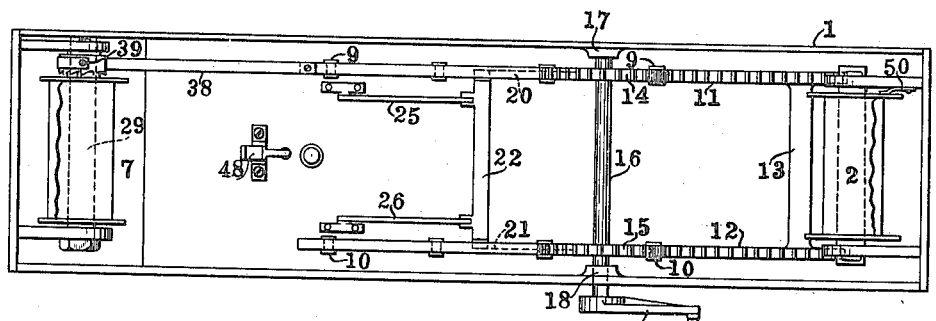
Fig.3. 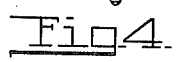 Fig.4.
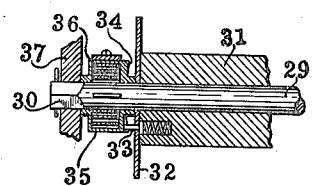
Witnesses
C. H. Volk.
Jesse G. Holton.
H. Van R. Palmer, Inventor
By his Attorneys
Drull Warfield & Drull

UNITED STATES PATENT OFFICE.

HOWARD VAN R. PALMER, OF DUMONT, NEW JERSEY.

PHOTOGRAPHIC DEVICE.

1,143,722.　　Specification of Letters Patent.　Patented June 22, 1915.

Application filed June 30, 1913. Serial No. 774,727.

*To all whom it may concern:*

Be it known that I, HOWARD VAN R. PALMER, a citizen of the United States, residing at Dumont, in the county of Bergen and State of New Jersey, have invented certain new and useful Improvements in Photographic Devices, of which the following is a full, clear, and exact description, such as will enable others skilled in the art to which it appertains to make and use the same.

This invention relates to photographic devices, and with respect to certain more specific features thereof, to devices of such a nature adapted to be used in connection with the more penetrating rays of light, such, for instance, as the X-rays.

This invention has for one of its objects to provide apparatus of the character above referred to which will embody features of simplicity and durability.

Another object of this invention is the provision of a compact and inexpensive apparatus for reproducing optical phenomena in connection with the human body and to make such a reproduction upon a flexible film in contradistinction to a rigid plate.

Other objects will be in part obvious and in part pointed out hereinafter.

This invention probably finds one of its most important applications in connection with the X or Röntgen rays, but it is to be understood that it is not limited to a use employing this particular class of rays.

It will be obvious that the invention in its broad aspect might be readily and effectively used in connection with ultra-violet rays, the effectiveness of the device in the various instances of employment of rays of different characters being dependent merely upon the respective transmitting, reflecting or absorbing properties of the materials used.

It is to be understood further that certain broad features of the invention are applicable to the ordinary photographic device employing a lens or a plurality of lenses.

The invention accordingly consists in the features of construction, combinations of elements and arrangement of parts which will be exemplified in the construction hereinafter set forth, and the scope of the application of which will be indicated in the following claims.

Referring now to the drawing, in which is shown one of various possible embodiments of the invention,—Figure 1 is a general longitudinal section of the invention, with a source of X-rays indicated in operative relation thereto; Fig. 2 is a plan view with upper parts of the casing and associated members removed to show more clearly the interior structure; and Figs. 3 and 4 are, respectively, enlarged detail views in longitudinal and cross-section of a portion of the feeding mechanism for the film used in connection with this invention.

In the drawing, in which similar reference characters refer to similar parts throughout the different views, the numeral 1 indicates a casing in which a film support embodying a rotatable film-spool 2 is mounted. On this spool may be arranged a continuous supply of flexible sensitized film sufficient for taking a plurality of X-ray photographs of the object. The casing 1 in this preferred form of the invention is provided, on the upper side thereof, with a substantially opaque light baffle 3, preferably of lead, and provided with an aperture or film exposure 4. Disposed across the aperture 4 is a second light baffle 5, consisting of two sheets 6 of aluminum or like material impenetrable by ordinary light and substantially transparent to or penetrable by the X-rays and which may wholly or partially support the object to be photographed. The casing 1 has a downwardly extending portion 7 for a purpose which will hereinafter be set forth. On the inner side of the bottom wall 8 there are provided two series of guiding rollers 9 and 10 spaced apart and adapted to guide rack members 11 and 12 of a bail-shaped member 13. The rack members 11 and 12 mesh with relatively corresponding gears 14 and 15 fixed to a shaft 16 and having bearings in the casing 1, as indicated at 17 and 18. One end of the shaft 16 projects through the casing and is provided on its projecting end with a handle 19 to rotate the same.

The rack members 11 and 12 are, respectively, provided with oppositely disposed slots 20 and 21 and slidably engage a cross member 22. An intensifying member or screen 23 comprising a flat-sided plate for flattening the film at the place of exposure is movably mounted in the casing 1, as by being pivoted at 24, and has a movement on said pivot toward and away from the exposure aperture 5 and the plane in which the exposed portion of the film lies when a photograph is being taken, connecting links 25 and 26 pivotally connecting the intensifying screen 23 with the cross member 22. The film 27 is wound on the film-spool 2 and covered throughout its winding by means of the flexible light-filter, as the orange paper 28 or any suitable material. Upon a shaft 29, fixed in the casing 1 and secured therein against rotary displacement by means of a squared end 30, there is loosely mounted a receiving roll or second spool 31. This receiving roll 31 is provided with a flange 32 at either end thereof, and a spring-pressed plunger 33 adapted to co-act with teeth 34 formed on the inner surface of the disk 35. Disk 35 is provided with an interior coil leaf spring 36, one end of which is secured to the disk 35 and the other to the shaft 29, as indicated at 37. A flexible tape 38 extends from one end of the rack member 11 to the disk 35 and is fixed thereto, as indicated, at 39. Suitable guide rollers 40 and 41 and a guide member 42 are provided to direct the feed of the orange paper 28. A resilient stop 43 is supported by the lower wall of the casing and provides resilient abutting means for the intensifying screen when in its lower position. An adjustable knife blade or cutter is indicated at 44, adjustable between the thumb-screws 45 and 46, and adapted to coact with a knife blade or cutter 47 secured to the end of the intensifying screen 23. An indicator 48 is supported by the lower wall 8 of the casing 1 and projects upwardly slightly above the upper side of the intensifying screen 23 when the latter is in its lowermost position. This indicator is adapted to be engaged by the end edge of the film 27 and be moved thereby to advise the operator that the film is ready for the first exposure. It is to be understood that suitable means (not shown in the drawing) are provided to temporarily open a portion of the casing 1 for the purpose of making various necessary adjustments. It will be observed that by the foregoing arrangement the main supply of film is effectively screened from action of the X-rays, the lead screen 3, being disposed between the source of X-rays and the film-spool 2 and also between said source and that part of the apparatus which receives the severed portion of said film, the portion of film to be acted upon moving alternately first from beneath the impervious screen 3 to opposite the pervious object support 4, and then to opposite the impervious screen 3 on the other side of the casing.

Assuming that the necessary preliminary adjustments have been made, such, for instance, as the introduction of the film-spool into the casing and the passing of the orange paper over the rollers 40 and 41 to the second spool or receiving roll 31 and fixing the paper to the spool 31 in any suitable manner, the operation is as follows: The shaft 16 is rotated in the direction of the arrow by means of the handle 19 and thereupon the gears 14 and 15, fixed to the shaft 16, will move the bail-shaped member 13 in a forward direction. As this member moves forward the flexible tape 38 is taken up upon the disk 35, the latter having a tendency to rotate in the proper direction by reason of the spring 36, it being understood that the teeth 34 are suitably shaped to click by the spring-pressed plunger 33 in the take-up direction of movement. As the rack members 11 and 12 of the bail-shaped member 13 move forward the opposite ends of the cross member 22 play in the slots 20 and 21, respectively, until the rear walls of said slots take up the opposite ends of the cross member 22 and carry the same in a forward direction. This causes the intensifying screen 23 to move about its pivot 24 and the handle 19 is rotated until the intensifying screen 23 has been moved into a position parallel to the baffle members 6. At this time the device is ready for the application of the light rays, it being understood that the object to be reproduced is supported upon the top of the casing between the source of light and the exposure aperture 5. After the exposure, the handle 19 is rotated in the opposite direction, moving the rack members 11 and 12 toward the film-spool 2. The tape 38 is thereby moved in the same direction, tending to unroll the same from the disk 35. The teeth 34 of said disk are so shaped as to provide a locking engagement with the plunger 33 in this backward direction of movement. This causes the receiving spool 31 to turn about the shaft 29 in a film feeding direction and to take up a predetermined amount of the orange paper 28. The orange paper 28 being wound with the film 27 and thus operatively connected to the film-spool, it will be obvious that this movement of the one will cause a corresponding movement of the other, and as the orange paper 28 is taken up upon the receiving roll 31, the film 27 is simultaneously moved over the intensifying screen 23 and down into the closure 7, a successive portion of the film being thus moved to position opposite the object support, and then into position opposite the impervious screen. It will furthermore be noted that the construction of the apparatus is such that when photographs are being taken, ordinary light is excluded from the interior of the casing at any part where the film might be fogged. It is observed that in case a strong support for the object being photographed is not required, the orange paper 28 alone would be sufficient to support a light object, and at the same time protect the film from ordinary light.

As the rack members 11 and 12 move toward the film spool 2 the cross member 22 follows the retreating end walls of the slots 20 and 21 because of the substantially heavy character of the intensifying plate or screen which drops by gravity until checked by the resilient stop 43. Further movement of the rack members 11 and 12 causes the opposite end walls of the slots 20 and 21 to contact with the cross member 22 thereby positively engaging the plate or screen 23 with said stop.

The above-described operation presents the film for exposure and subsequently moves the film out of the plane of exposure and feeds it in a general direction toward the downwardly extending portion 7 of the casing 1. Upon the next movement of the rack members 11 and 12 forward and a consequent movement of the intensifying screen 23 carrying the knife blade 47, the previously exposed portion of the film 28 will be severed from the remainder of the film by reason of the cutting engagement of the knife 47 on the movable intensifying screen 23 with the fixed knife 44 and the exposed portion of the film will be disposed in the portion 7 of the casing 1, where it may be immediately developed or where it may be merely temporarily retained. A retard 50 is provided bearing against the film-spool 2 to prevent over-running of the film.

It will be seen from the above description that there is provided an extremely simple and compact device comprising a flexible film and one which is adapted to be used in connection with the X-rays or with the other more penetrating rays.

For convenience the term "X-ray" will be used in the following claims although it is to be understood that this is a mere relative or descriptive term to describe those rays of light of a more penetrating character than ordinary light rays and for this reason is not to be interpreted or limited to that specific type of rays technically known by this name.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is—

1. An X-ray photographic apparatus comprising, in combination, a support for the object to be photographed, said support being capable of being penetrated by X-rays but impenetrable by ordinary light rays, means adapted to support a continuous supply of flexible sensitized film sufficient for taking a plurality of X-ray photographs of the object, means adapted to move said film relatively to said object support so that successive portions thereof may be presented opposite said object support, means substantially impervious to X-rays adapted to screen from X-rays the portion of said film at the side of said object support and means adapted to flatten the portion of said film opposite said object support.

2. An X-ray photographic apparatus comprising, in combination, a support for the object to be photographed, said support being capable of being penetrated by X-rays but impenetrable by ordinary light rays, means adapted to support a supply of continuous flexible sensitized film sufficient for taking a plurality of X-ray photographs of the object, and means adapted to move said film relatively to said object support so that successive portions thereof may be presented opposite said object support, means substantially impervious to X-rays adapted to screen from X-rays the portion of said film at the side of said object, means adapted to flatten the portion of said film opposite said object support and means adapted to sever successive exposed portions of said film from the supply of film.

3. An X-ray photographic apparatus comprising, in combination, a casing adapted to receive a flexible sensitized film, said casing being of a construction to exclude ordinary light while photographs are being taken, and comprising a portion pervious to X-rays and a portion impervious thereto, and means including a movable film support within said casing adapted, when operated, to feed film alternately into positions opposite said pervious portion and said impervious portion.

4. An X-ray photographic apparatus comprising, in combination, a casing adapted to receive a flexible sensitized film, said casing being of a construction to exclude ordinary light while photographs are being taken, and comprising a portion pervious to X-rays and a portion impervious thereto, and means including a movable film support within said casing and opposite said impervious portion, adapted when operated to deliver film from position opposite said impervious portion to position opposite said pervious and impervious portions, successively.

5. An X-ray photographic apparatus comprising, in combination, a casing adapted to receive a flexible sensitized film, and of a construction to exclude ordinary light while photographs are being taken, a film flattening member adapted to be moved toward and from the plane in which the exposed portion of the film lies when a photograph is being taken, and means adapted to feed the film in said casing and move the film relative to said film flattening member.

6. An X-ray photographic apparatus comprising, in combination, a casing adapted to receive a flexible sensitized film, and of a construction to exclude ordinary light while photographs are being taken, an intensifying film flattening member adapted to be moved toward and from the plane in which the exposed portion of the film lies when a photograph is being taken, and means adapted to feed the film in said casing and move the film relative to said film flattening member.

7. An X-ray photographic apparatus comprising, in combination, a casing adapted to receive a flexible sensitized film, and of a construction to exclude ordinary light while photographs are being taken, an intensifying film flattening member adapted to be moved toward and from the plane in which the exposed portion of the film lies when a photograph is being taken and means comprising a cutter movable with said member adapted to coöperate in severing said film.

8. An X-ray photographic apparatus, comprising, in combination, a plurality of spools, one of which is a film spool, a flexible light filter connected with the other spool so as to turn therewith and so connected to said film spool as to turn the latter in a direction to feed film into exposed position when said other spool is turned in a film feeding direction, said flexible member being interposed between said film and the source of X-rays.

9. An X-ray photographic apparatus, comprising, in combination, a plurality of spools, one of which is a film spool, a flexible light filter connected with the other spool so as to turn therewith and so connected to said film spool as to turn the latter in a direction to feed film into exposed position when said other spool is turned in a film feeding direction, said flexible member being interposed between said film and the source of X-rays and an object support between said film and the source of X-rays, said support being pervious to X-rays and impervious to ordinary light rays.

10. An X-ray photographic apparatus, comprising, in combination, a casing adapted to receive a flexible sensitized film, said casing being of a construction to exclude ordinary light while photographs are being taken and comprising a portion pervious to X-rays and a portion impervious thereto, means including a film support within said casing adapted when operated to feed a film into positions opposite said pervious portion and said impervious portion and an intensifying member adapted to be moved toward and from the plane in which the exposed portion of the film lies when a photograph is being taken.

11. An X-ray photographic apparatus comprising, in combination, a casing adapted to receive a flexible sensitized film, said casing being of a construction to exclude ordinary light while photographs are being taken and comprising a portion pervious to X-rays and a portion impervious thereto, means including a movable film support within said casing adapted when operated to feed a film into positions opposite said pervious portion and said impervious portion, an intensifying member adapted to be moved toward and from the plane in which the exposed portion of the film lies when a photograph is being taken, and means comprising a cutter movable with said intensifying member adapted to coöperate in severing said film.

12. An X-ray photographic apparatus comprising, in combination, a casing adapted to receive a flexible sensitized film, said casing being of a construction to exclude ordinary light while photographs are being taken and comprising a portion pervious to X-rays and a portion impervious thereto, a plurality of spools one of which is a film spool, a light filter connected with the other spool so as to move therewith, and so connected to said film spool as to turn the latter in a direction to feed the film into position in said casing opposite said pervious portion when said other spool is turned in a film feeding direction, said light filter being interposed between said film and the source of X-rays.

13. An X-ray photographic apparatus comprising, in combination, a casing adapted to receive a flexible sensitized film, said casing being of a construction to exclude ordinary light while photographs are being taken and comprising a portion pervious to X-rays and a portion impervious thereto, a plurality of spools one of which is a film spool, a flexible light filter connected with the other spool so as to move therewith, and so connected to said film spool as to turn the latter in a direction to feed the film into position in said casing opposite said pervious portion when said other spool is turned in a film feeding direction, said flexible light filter being interposed between said film and the source of X-rays and an object support between said film and the source of X-rays, said support being pervious to X-rays and impervious to ordinary light rays.

14. An X-ray photographic apparatus comprising, in combination, a casing adapted to receive a flexible sensitized film, said casing being of a construction to exclude ordinary light while photographs are being taken and comprising a portion pervious to X-rays and a portion impervious thereto, a plurality of spools one of which is a film spool, a flexible light filter connected with the other spool so as to move therewith, and so connected to said film support as to turn the latter in a direction to feed the film into position in said casing opposite said pervious portion when said other spool is turned in a film feeding direction, said flexible member being interposed between said film and the source of X-rays, and an intensifying film flattening member adapted to be moved toward and from the plane in which the exposed portion of the film lies when a photograph is being taken.

15. An X-ray photographic apparatus comprising, in combination, a casing adapted to receive a flexible sensitized film, said casing being of a construction to exclude ordinary light while photographs are being taken and comprising a portion pervious to X-rays and a portion impervious thereto, a plurality of spools one of which is a film spool, a flexible light filter connected with the other spool so as to move therewith, and so connected to said film spool as to turn the latter in a direction to feed the film into position in said casing opposite said pervious portion when said other spool is turned in a film feeding direction, said light filter being interposed between said film and the source of X-rays, an intensifying film flattening member adapted to be moved toward and from the plane in which the exposed portion of the film lies when a photograph is being taken, and means comprising a cutter movable with said film flattening member adapted to coöperate in severing said film.

16. An X-ray photographic apparatus comprising, in combination, a support, a film spool, a second spool, a flexible member properly connected to said film spool and said second spool so as to wind upon the latter and unwind from the former as said second spool is turned, an intensifying member movable toward and from the plane in which the film lies when photographs are being taken, and means whereby said second spool is turned and thereby effects feeding movement of the film upon movement of said intensifying member.

17. An X-ray photographic apparatus comprising, in combination, a support, a film spool, a second spool, a flexible member connected to said film spool and said second spool so as to wind upon the latter and unwind from the former as said second spool is turned, an intensifying member movable toward and from the plane in which the film lies when photographs are being taken, means whereby said second spool is turned and thereby effects feeding movement of the film upon movement of said intensifying member, and film cutting members respectively carried by said support and said intensifying member.

18. An X-ray photographic apparatus comprising, in combination, a support, a film spool, a second spool, a flexible member properly connected to said film spool and said second spool so as to wind upon the latter and unwind from the former as said second spool is turned, an intensifying member movable toward and from the plane in which the film lies when photographs are being taken, and means whereby said second spool is turned and thereby effects intermittent feeding movement of the film upon movement of said intensifying member, comprising a spring adapted to turn said second spool in one direction, and operative connections between said second spool and said intensifying member adapted to turn said second spool in the opposite direction.

19. In apparatus of the character described, in combination, a casing having a film exposure, means adapted to support a film in said casing, means comprising a flattener pivotally mounted in said casing adapted to move a portion of the film into and out of the plane of exposure, and means whereby said portion is severed from the remainder of the film.

20. In apparatus of the character described, in combination, a casing having a film exposure, means adapted to support a film in said casing, means comprising a member pivotally mounted in said casing adapted to move a portion of said film into and out of the plane of exposure, and means comprising cutting elements one on said pivotally mounted member and one in fixed relation with said casing adapted to coact with the other to disconnect a portion of the film from the remainder thereof.

In testimony whereof I affix my signature, in the presence of two witnesses.

HOWARD VAN R. PALMER.

Witnesses:
P. A. BLAIR,
C. J. KULBERG.